United States Patent
Henderson et al.

(10) Patent No.: US 9,741,707 B2
(45) Date of Patent: Aug. 22, 2017

(54) IMMUNITY TO INLINE CHARGING DAMAGE IN CIRCUIT DESIGNS

(71) Applicant: INTERNATIONAL BUSINESS MACHINES CORPORATION, Armonk, NY (US)

(72) Inventors: Zachary Henderson, Jamaica Plain, MA (US); Jason D. Hibbeler, Williston, VT (US); Terence B. Hook, Jericho, VT (US); Nicholas Palmer, Beaverton, OR (US); Kirk D. Peterson, Jericho, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/098,406

(22) Filed: Apr. 14, 2016

(65) Prior Publication Data
US 2016/0329317 A1    Nov. 10, 2016

Related U.S. Application Data

(63) Continuation of application No. 14/707,576, filed on May 8, 2015, now Pat. No. 9,378,329.

(51) Int. Cl.
*H01L 27/02* (2006.01)
*H01L 29/06* (2006.01)
*G06F 17/50* (2006.01)

(52) U.S. Cl.
CPC ...... *H01L 27/0251* (2013.01); *G06F 17/5081* (2013.01); *H01L 27/0207* (2013.01); *H01L 29/0657* (2013.01)

(58) Field of Classification Search
None
See application file for complete search history.

(56) References Cited

U.S. PATENT DOCUMENTS

| | | |
|---|---|---|
| 5,966,517 A | 10/1999 | Cronin, III et al. |
| 6,496,959 B1 | 12/2002 | Noguchi |
| 6,862,723 B1 | 3/2005 | Wang et al. |

(Continued)

OTHER PUBLICATIONS

Huang et al., "A Polynomial Time-Optimal Diode Insertion/Routing Algorithm for Fixing Antenna Problem." IEEE Transactions on Computer-Aided Design of Integrated Circuits and Systems, vol. 23, No. 1, Jan. 2004, pp. 141-147.

(Continued)

*Primary Examiner* — Joseph Schoenholtz
(74) *Attorney, Agent, or Firm* — Steven J. Meyers; Andew M. Calderon; Roberts Mlotkowski Safran Cole & Calderon, P.C.

(57) ABSTRACT

Approaches for checking a design of an integrated circuit using an antenna rule are provided. A method includes determining a figure of merit for a transistor based on a resistance of a shunt path of the transistor relative to the size of the antenna and the size of the transistor. The method also includes comparing the determined figure of merit to a limit. The method further includes deeming the transistor to pass the antenna rule when the figure of merit is less than the limit, and deeming the transistor to fail the antenna rule when the figure of merit is greater than the limit. The determining and the comparing are performed by a computer device.

7 Claims, 3 Drawing Sheets

50

| Design # | Rg | Rsd | Rs | FOM |
|---|---|---|---|---|
| 1 | 51 | 1E+12 | 27 | 1.282 |
| 2 | 38 | 42 | 21 | 0.705 |
| 3 | 44 | 316 | 156 | 0.306 |
| 4 | 49 | 126 | 25 | 0.851 |
| 5 | 49 | 191 | 25 | 0.974 |
| 6 | 51 | 1E+12 | 13 | 1.562 |
| 7 | 184 | 1E+12 | 27 | 0.474 |
| 8 | 48 | 97 | 24 | 0.797 |

FOM = Rsd/(Rsd+Rg+Rs)*1/(Rg+Rs)

(56) References Cited

U.S. PATENT DOCUMENTS

| | | | |
|---|---|---|---|
| 7,067,886 | B2 | 6/2006 | Bonges, III et al. |
| 7,174,527 | B2 | 2/2007 | Itou et al. |
| 7,302,663 | B1 | 11/2007 | Gan et al. |
| 7,560,345 | B2 | 7/2009 | Hook et al. |
| 7,712,057 | B2 | 5/2010 | Bonges et al. |
| 7,804,317 | B1 * | 9/2010 | Parameshwaran .. G01R 31/2884 324/762.02 |
| 7,863,112 | B2 | 1/2011 | Nair et al. |
| 8,445,966 | B2 | 5/2013 | Rogers et al. |
| 8,484,595 | B2 | 7/2013 | Sakamoto |
| 8,546,855 | B2 | 10/2013 | Zhou et al. |
| 2011/0204358 | A1 | 8/2011 | Sakamoto |
| 2014/0159157 | A1* | 6/2014 | Jensen ................. H01L 27/088 257/368 |
| 2014/0264520 | A1* | 9/2014 | Reisiger ............. H01L 27/0288 257/300 |
| 2015/0097534 | A1* | 4/2015 | Bhattad ................. G05F 1/462 323/270 |

OTHER PUBLICATIONS

Ho et al., "Multilevel Routing with Antenna Avoidance," International Symposium on Physical Design, 2004, pp. 34-40.

Maly et al., "Detection of an Antenna Effect in VLSI designs," IEEE International Symposium on Defect and Fault Tolerance in VLSI and Nanotechnology Systems (DFT), 1996, pp. 86-94.

Shirota et al., "A New Router for Reducing "Antenna Effect" in ASIC design," IEEE Custom Integrated Circuits conference, 1998, pp. 601-604.

"List of IBM Patents or Patent Applications Treated as Related" 1 page.

U.S. Appl. No. 14/707,576, filed May 8, 2015, 31 pages.

U.S. Appl. No. 15/098,396, filed Apr. 14, 2016, 28 pages.

Office Action from U.S. Appl. No. 15/098,396 dated Dec. 23, 2016. 7 pages.

Notice of Allowance from U.S. Appl. No. 15/098,396 dated Apr. 12, 2017; 9 pages.

* cited by examiner $FOM = Rsd/(Rsd+Rg+Rs) * 1/(Rg+Rs)$

IMMUNITY TO INLINE CHARGING DAMAGE IN CIRCUIT DESIGNS

FIELD OF THE INVENTION

The invention relates to designing and manufacturing semiconductor devices and, more particularly, to a design methodology for avoiding plasma induced gate oxide damage during the manufacture of integrated circuits.

BACKGROUND

The antenna effect, also called plasma induced gate oxide damage, is an effect that can potentially cause yield and reliability problems during the manufacture of metal-oxide-semiconductor (MOS) integrated circuits. Damage is caused by the accumulation of charges collected by floating conductors which act like antennas by focusing energy into a transistor during a plasma process. Specifically, charging may occur during intermediate steps of the manufacturing process when uncovered conductive elements are directly exposed to plasma. When the conductive elements are connected to a gate of a transistor, the plasma-induced charge that has accumulated on the conductive elements can discharge through the gate oxide of the transistor causing damage to the transistor. Plasma induced gate oxide damage can occur during both front and back end of line processes and, thus, is a type of inline charging damage.

Integrated circuit manufacturers commonly impose antenna rules that are designed to avoid plasma induced gate oxide damage. Antenna rules may include: limiting the size of large plates of metal or polysilicon connected to gate of a transistor; restricting a maximum antenna size or antenna ratio for a circuit layout; and thereby limiting the total charge accumulated on metal connected to a gate to less than a threshold amount. Conventional antenna rules ignore transistors in which there is a shunt path between the gate and the source/drain of the transistor. These shunted transistors are considered immune to plasma induced gate oxide damage due to the conductive shunt path. However, treating such transistors as immune disadvantageously fails to take into account the resistance of the shunt path.

SUMMARY

In a first aspect of the invention, there is a method of checking a design of an integrated circuit using an antenna rule. The method includes determining a figure of merit for a transistor based on a resistance of a shunt path of the transistor relative to the size of the antenna and the size of the transistor. The method also includes comparing the determined figure of merit to a limit. The method further includes deeming the transistor to pass the antenna rule when the figure of merit is less than the limit, and deeming the transistor to fail the antenna rule when the figure of merit is greater than the limit. The determining and the comparing are performed by a computer device.

In another aspect of the invention, there is a method of checking a design of an integrated circuit using an antenna rule. The method includes checking a subset of a plurality of transistors of the design of the integrated circuit using the antenna rule. The checking includes for each respective transistor in the subset: determining, by a computer device, a resistance of a gate path of the respective transistor; determining, by the computer device, a resistance of a source/drain path of the respective transistor; determining, by the computer device, a resistance of a shunt path of the respective transistor; determining, by the computer device, a figure of merit for the respective transistor based on the resistance of the shunt path, the resistance of the gate path, and the resistance of the source/drain path; and comparing, by the computer device, the figure of merit for the respective transistor to a limit.

In another aspect of the invention, there is a semiconductor structure that includes: a transistor comprising a gate and a source/drain; a first electrically conductive element; a second electrically conductive element; a first electrically conductive path from the gate to the first electrically conductive element; a second electrically conductive path from the source/drain to the second electrically conductive element; and a third electrically conductive path from the gate to the source drain. The transistor satisfies the expression $Rsd/(Rsd+Rg+Rs)*1/(Rg+Rs)<X$, where: Rg is the resistance of the first path; Rsd is the resistance of the second path; Rs is the resistance of the third path; and X is a pre-defined limit value.

DETAILED DESCRIPTION

The invention relates to designing and manufacturing semiconductor devices and, more particularly, to a design methodology for avoiding plasma induced gate oxide damage during the manufacture of integrated circuits. According to aspects of the invention, an antenna rule is based at least in part on a resistance of a shunt path that extends from a gate to a source/drain of a transistor.

Figure 1:
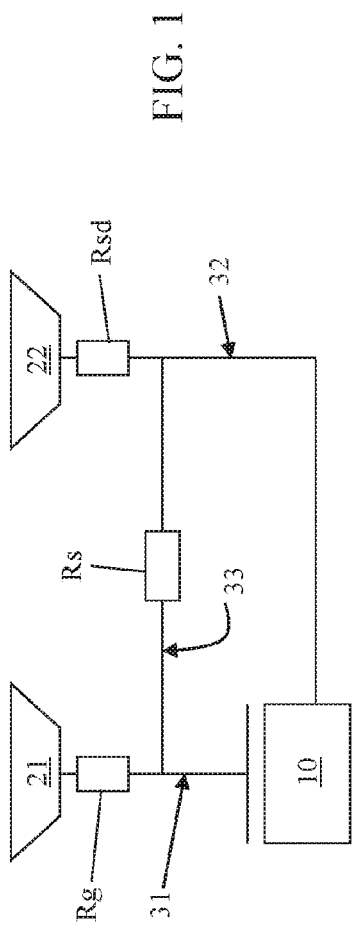
FIG. 1 shows a diagrammatic view of a portion of a design of an integrated circuit device in accordance with aspects of the invention.

FIG. 1 shows a diagrammatic view of a portion of a design of a MOS integrated circuit device in accordance with aspects of the invention. Specifically, FIG. 1 shows a transistor (e.g., a field effect transistor) 10, a first conductive element 21, and a second conductive element 22. The transistor 10 may be on a substrate such as a silicon-on-insulator (SOI) substrate. The electrically conductive elements 21 and 22 may be in one or more interlevel dielectric (ILD) layers formed on and over the transistor 10 and the substrate. The electrically conductive elements 21 and 22 may represent, for example, wires, vias, interconnects, etc., that are exposed (i.e., not covered by shielding thick dielectric material) during a manufacturing step of the integrated circuit device.

Still referring to FIG. 1, a first electrically conductive path 31 extends from the first conductive element 21 to a gate of the transistor 10, and a second electrically conductive path 32 extends from the second conductive element 22 to a source/drain of the transistor 10. Additionally, a third electrically conductive path 33 (referred to as a shunt path) extends between the first path 31 and the second path 32 and, thus, represents a shunt path between the gate and the source/drain of the transistor 10. The paths 31, 32, 33 represent portions of an electrical net defined by the design of the integrated circuit device. The paths 31, 32, 33 may comprise, for example, portions of wires, vias, interconnects in the ILD layers over the transistor 10. The paths 31, 32, 33 may also comprise conductive regions in the substrate on which the transistor 10 is arranged.

With continued reference to FIG. 1, the first conductive element 21 and the second conductive element 22 are uncovered and thus may be exposed to plasma during certain manufacturing steps of the semiconductor structure. This exposure to plasma may induce a charge on the elements 21, 22 that can lead to plasma induced gate oxide damage of the transistor 10. Conventional antenna rules ignore a transistor, such as transistor 10, that has a gate to source/drain shunt path (e.g., path 33) since the conventional rules assume that such a transistor is immune from plasma induced gate oxide damage due to the shunt path. Thus, a conventional antenna rule would not indicate the transistor 10 and paths 31, 32 as violating the antenna rule. However, aspects of the invention check the transistor 10 against an antenna rule that takes the resistance of the paths 31, 32, 33 into account. It has been discovered that the resistance of the shunt path 33 may be sufficiently high such that the shunt path 33 does not adequately shunt the charge collected on the elements 21 and 22. In such a situation, the transistor 10 can still suffer plasma induced gate oxide damage despite the existence of the shunt path 33.

Accordingly, aspects of the invention define an antenna rule that is based in part on the resistance of a shunt path. In embodiments, the antenna rule is given by Expression 1 as:

$$FOM = Rsd/(Rsd+Rg+Rs)*1/(Rg+Rs) < X \quad (1)$$

Referring to FIG. 1, "Rg" represents the electrical resistance of the path 31 extending between the first conductive element 21 and the gate of the transistor 10. "Rsd" represents the electrical resistance of the path 32 extending between the second conductive element 22 and the source/drain of the transistor 10. "Rs" represents the electrical resistance of the shunt path 33 extending between the gate and the source/drain of the transistor 10. Numerical values of Rg, Rsd, and Rs may be determined in an automated manner using electronic design automation (EDA) tools. For example, an EDA tool may be used to identify circuit elements of a design that make up a path between two endpoints of the design, e.g., elements that make up path 31 between transistor 10 and element 21. After a path is determined, an EDA tool may be used to determine a series resistance of the elements that make up the path by using design data such as material (properties), length, and cross-sectional area of each element in the path.

In Expression 1, "X" represents a limit value that may be empirically determined, for example, based on analyzing existing designs of integrated circuits that have been manufactured. For example, a figure of merit ("FOM") may be determined according to Expression 1 for a plurality of existing designs. Based on the determined FOM of each design combined with observances of whether plasma induced gate oxide damage occurred (or didn't occur) in devices manufactured according to each design, a value of "X" may be selected to provide a calculated confidence of whether plasma induced gate oxide damage is likely to occur in a design.

Figure 2:
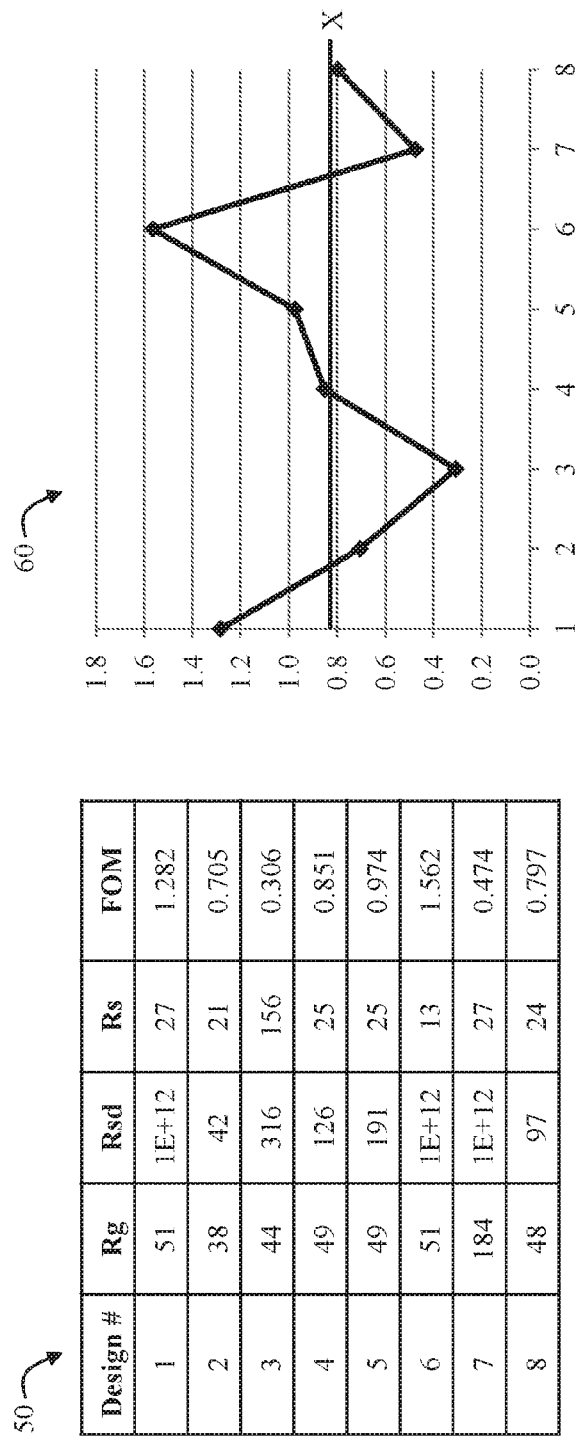
FIG. 2 tabular data and graphical data implementing an antenna rule in accordance with aspects of the invention.

FIG. 2 illustrates an application of an antenna rule based on Expression 1 in accordance with aspects of the invention. Specifically, FIG. 2 shows a table 50 with exemplary values of Rg, Rsd, and Rs for eight different exemplary designs. The table 50 includes the FOM determined according to Expression 1 for each of the eight designs. FIG. 2 also shows a graph 60 containing a plot of the FOM values (vertical axis) versus the design number (horizontal axis). The graph 60 also includes the limit value "X" which has been empirically determined. According to aspects of the invention, each design with an FOM less than X is deemed to pass the antenna rule, whereas each design with an FOM greater than X is deemed to fail the antenna rule. Accordingly, in the example shown in FIG. 2, design numbers 2, 3, 7, 8 are considered good, while design numbers 1, 4, 5, 6 are flagged as bad and targeted for redesign.

With continued reference to FIG. 2, designs 1, 6, and 7 have an Rsd value of 1E+12. This value for Rsd corresponds to an essentially infinite resistance and is used for designs in which a shunt path does not exist between the gate and the source/drain of the transistor. Conversely, designs 2-5 and 8 do include a shunt path (e.g., path 33) and thus have values of Rsd that are less than 1E+12. Of these designs that have a shunt path, designs 4 and 5 each have an FOM greater than X and, thus, are deemed to fail the antenna rule. This is in contrast to antenna rules that do not take shunt path resistance into account and which would automatically pass designs 4 and 5 based on the mere existence of a shunt path.

In another embodiment, an antenna rule that takes shunt path resistance into account can take the form of Expression 2:

$$FOM = Rs/(v/Ag+Rg+v/Asd+Rsd+Rs) < X \quad (2)$$

Rg, Rsd, and Rs in Expression 2 have the same meaning as the same terms used in Expression 1. "Ag" represents the exposed area of the conductive element(s) connected to the gate of the transistor (e.g., element 21 in FIG. 1). "Asd" represents the exposed area of the conductive element(s) connected to the source/drain of the transistor (e.g., element 2 in FIG. 1). The term "v" represents the specific impedance of the antenna to the plasma, and is process specific.

A value of "v" may determined empirically. For example, the capability of a plasma to establish a potential and deliver current to an electrical net on the wafer and thence to a transistor susceptible to damage will be determined by a number of factors. The configuration of interest is a wafer, partially processed, in a chamber where a plasma is present, in which etching or deposition is being conducted. Other electrically active processes such as triboelectric charging may also be relevant. Firstly, the area of the exposed conductor plays a role: the larger the area the larger the current that may be supplied to the susceptible transistor. Secondly, the topography of the surface may play a role through the electron shading effect wherein the bottom of high aspect ratio holes tends to charge positively through the asymmetric response of heavy ions and light electrons to the plasma potentials. Other factors may also be relevant, such as the physical location on the wafer or the physical proximity to other antennas. Process factors can be relevant, such as the electron temperature, the plasma pressure, and the presence of any magnetic fields. While the propensity to charging through differential electronic and ionic currents may in principle be established through detailed calculations, more typically empirical data is employed to determine the robustness of the combination of the transistor and the process technology.

Expression 2 takes into account the area of the exposed conductive elements that form the antenna. Expression 2 also takes into account the specific impedance of the antenna to the plasma, which is process specific.

Figure 3:
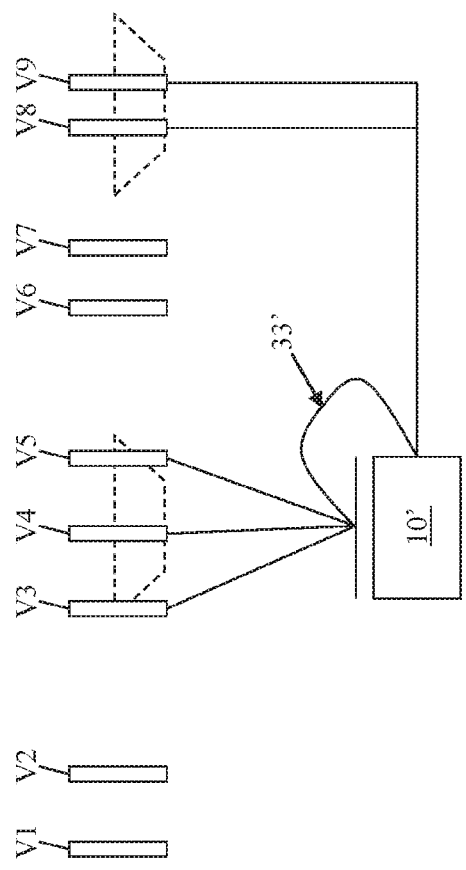
FIG. 3 shows a diagrammatic view of a portion of a design of an integrated circuit device in accordance with aspects of the invention.

FIG. 3 illustrates determining the FOM of Expression 2 for a transistor with plural paths forming an antenna. As depicted in FIG. 3, there may be plural conductive elements V1-V9 that are exposed to plasma during a manufacturing step. Some of the conductive elements (V3, V4, V5) may be electrically connected to the gate of the transistor 10' through respective paths. Some of the conductive elements (V8, V9) may be electrically connected to the source/drain of the transistor 10' through respective paths. And some of the conductive elements (V1, V2, V6, V7) are not electrically connected to the gate or the source/drain of the transistor 10'. As depicted in FIG. 3, there is also a shunt path 33' between the gate and the source/drain of the transistor 10'.

In embodiments, a method includes determining an FOM for Expression 2 by: determining a value of Rs for the shunt path 33'; determining v/Agx+Rgx for each conductive element Vx connected to the gate of the transistor 10'; and determining v/Asdx+Rsdx for each conductive element Vx connected to the gate of the transistor 10. EDA tools may be used to determine the value of Agx, Rgx, Asdx, and Rsdx for each conductive element Vx, e.g., in a manner similar to that described with respect to FIG. 1. For example, for conductive element V3 (x=3), the EDA tool may be used to determine: a path from the conductive element V3 to the gate of the transistor 10'; an exposed area of the conductive element V3; and a series resistance of the path between the conductive element V3 and the gate of the transistor 10'. Similar determinations may be made for each conductive element with a path to the gate, and for each conductive element with a path to the source/drain. The area and resistance determinations are not made for conductive elements that are not connected to either the gate or the source/drain (e.g., V1, V2, V6, V7).

Figure 4:
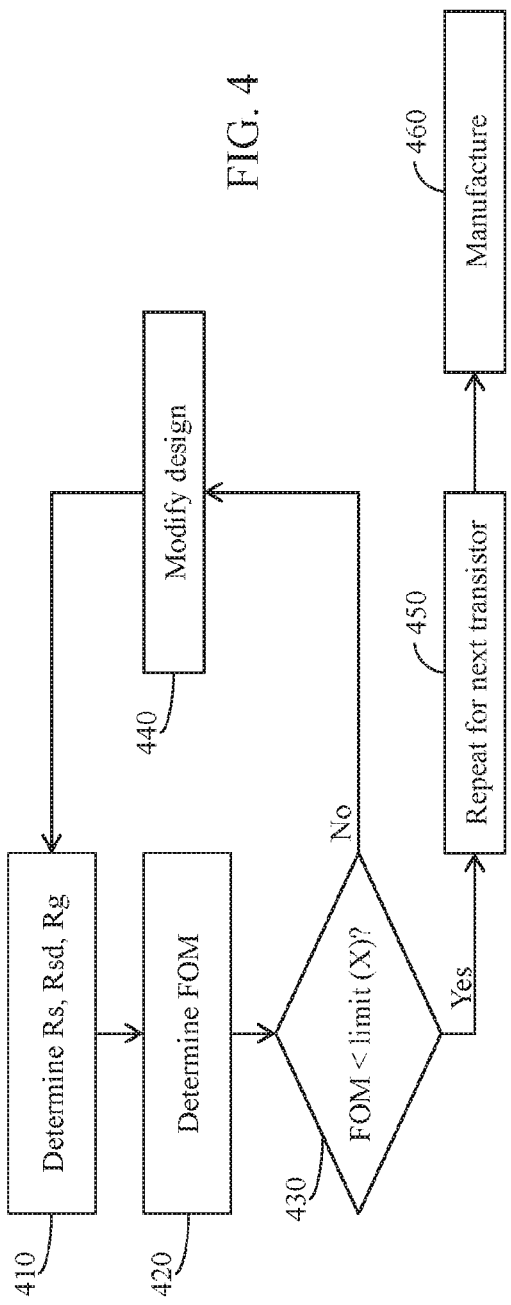
FIG. 4 shows a flow diagram of a method in accordance with aspects of the invention.

FIG. 4 shows a flow diagram of a method in accordance with aspects of the invention in which an antenna rule may be used as part of a design rule checking (DRC) process of a design of an integrated circuit. Accordingly, at step 410 series resistances Rg, Rs, and Rsd are determined for a particular transistor of an integrated circuit design. The resistances may be determined in the manner described with respect to FIG. 1. At step 420, a figure of merit (FOM) is determined for the transistor. The FOM may be determined using Expression 1 and the resistances from step 410. At step 430, the FOM from step 420 is compared to a limit value, e.g., limit "X" of Expression 1. In the event that FOM>X (i.e., the particular transistor fails the antenna rule), then at step 440 the integrated circuit design is modified to address the failure of the antenna rule. For example, certain elements of the design may be re-placed and/or re-routed using EDA methodology. After modifying the design at step 440, the method returns to step 410 where the method is repeated for the modified design. In the event that FOM<X (i.e., the particular transistor passes the antenna rule), then at step 450 the method is repeated for a next transistor, if any remain to be checked. At step 460, after all DRC is complete, the integrated circuit may be manufactured (e.g., physically fabricated).

The structures defined in the design of the integrated circuit can be implemented in semiconductor structures, which can be manufactured in a number of ways using a number of different tools. In general, though, the methodologies and tools are used to form the semiconductor implementations with dimensions in the micrometer and nanometer scale. The methodologies, i.e., technologies, employed to manufacture the semiconductor implementations have been adopted from integrated circuit (IC) technology. For example, the semiconductor implementations are built on wafers and are realized in films of material patterned by photolithographic processes on the top of a wafer. In particular, the fabrication of the semiconductor implementations uses three basic building blocks after the devices in the semiconductor substrate are built: (i) deposition of thin films of material on a substrate, (ii) applying a patterned mask on top of the films by photolithographic imaging, and (iii) etching the films selectively to the mask.

Design rule checking can be a lengthy and computationally expensive process. Applying an antenna rule described herein to each transistor of a design, at each design level, and including tracing each via and metal shape to each transistor is a lengthy process. Accordingly, in embodiments, an antenna rule described herein is selectively applied to less than all the transistors of a design. In this manner, the DRC process may be shortened.

In a first aspect, only exposed metal shapes (e.g., wires and interconnects) are considered when checking a transistor with an antenna rule described herein, and exposed vias are ignored. Charging events can occur anywhere in the back end of line (BEOL) and the effective charge collection area (i.e., the antenna) can include both vias and or metal shapes. Ignoring vias and only considering metal shapes reduces the number of elements that must be traced back to a transistor that is being checked. In this manner, implementations of the invention may include checking a subset of a plurality of transistors of the design of the integrated circuit using an antenna rule described herein, wherein the subset includes only transistors in which the gate path and the source/drain path each end at respective metal shapes other than vias.

In another aspect, an antenna rule described herein is used to check only shunted transistors, i.e. those that have a shunt path between the gate and the source/drain. Different antenna rules may be used to check non-shunted transistors, e.g., those that do not have a shunt path between the gate and the source/drain. In this manner, an antenna rule described herein may be used as a supplement to existing antenna rules rather than adding redundancy to or supplanting the existing rules. In this manner, implementations of the invention may include checking a subset of a plurality of transistors of the design of the integrated circuit using an antenna rule described herein, wherein the subset includes only transistors that include a shunt path between a gate and a source/drain.

In another aspect, an antenna rule described herein is used to check only transistors that are shunted with non-metallic shunt paths. A metallic shunt path generally provides sufficiently low resistance such that transistors having a metallic shunt path can be safely omitted from the checking to save time and resources. On the other hand, a shunt path composed of semiconductor (e.g., silicon-based) material can have a higher resistivity than that of metal, such that it is advantageous to check such transistors with an antenna rule described herein. In this manner, implementations of the invention may include checking a subset of a plurality of transistors of the design of the integrated circuit using an antenna rule described herein, wherein the subset includes only transistors that include a shunt path comprising a semiconductor material between a gate and a source/drain.

In another aspect, an antenna rule described herein is used to check only marginal devices, e.g., transistors that are indicated by another antenna rule as being potentially susceptible for shunting impedance. Devices that are potentially susceptible for shunting impedance may be determined by one or more of: comparing aspect ratios of vias connected to the source/drain and the gate of each of the devices; comparing chip locations of conductors connected to the source/drain and the gate of each of the devices; and comparing parasitic capacitances of conductors connected to the source/drain and gate of each of the devices and further determines the size of the antennas. For example, the integrated circuit may be sectioned into multiple parts or regions and each region individually examined and treated for potentially susceptible devices. Devices whose source/drain and gate are connected together at a location physically remote from the device may be identified as potentially susceptible to damage. According to aspects of the invention, such devices that are identified by another antenna rule as being susceptible for shunting impedance are further checked using an antenna rule as described herein. In this manner, implementations of the invention may include checking a subset of a plurality of transistors of the design of the integrated circuit using an antenna rule described herein, wherein the subset includes only transistors that are identified by a different antenna rule.

In another aspect, an antenna rule described herein is used to check only transistors that are identified by physical failure analysis as being inadequately shunted. For example, failure analysis that is performed on a fabricated circuit that has failed can be used to identify a failure of a particular transistor. In embodiments, instances of this same transistor that are included in a design are checked using an antenna rule described herein. In this manner, implementations of the invention may include checking a subset of a plurality of transistors of the design of the integrated circuit using an antenna rule described herein, wherein the subset includes only transistors that are identified by physical failure analysis.

In another aspect, an antenna rule described herein is used in hierarchical checking of transistors. Integrated circuit designs are often composed of repeating blocks. In embodiments, transistors whose connections at any given level do not extend beyond a repeating block are only checked once using an antenna rule described herein, e.g., for a single instantiation of the block. This aspect may include identifying transistors whose terminals (e.g., source, drain, gate connections) are contained within a repeating block, and those whose terminals extend outside of a repeating block. For each transistor that does not extend outside the block, only a single instance of the transistor is checked against an antenna rule described herein, and other instances of the transistor in other instances of the repeating block are not check but instead are deemed to have the same result as the transistor that was checked. This may be performed for plural different types of repeating blocks. In this manner, implementations of the invention may include checking a subset of a plurality of transistors of the design of the integrated circuit using an antenna rule described herein, wherein: the plurality of transistors includes a plurality of repeated instances of a particular transistor; and the subset includes only a single instance of the plurality of repeated instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
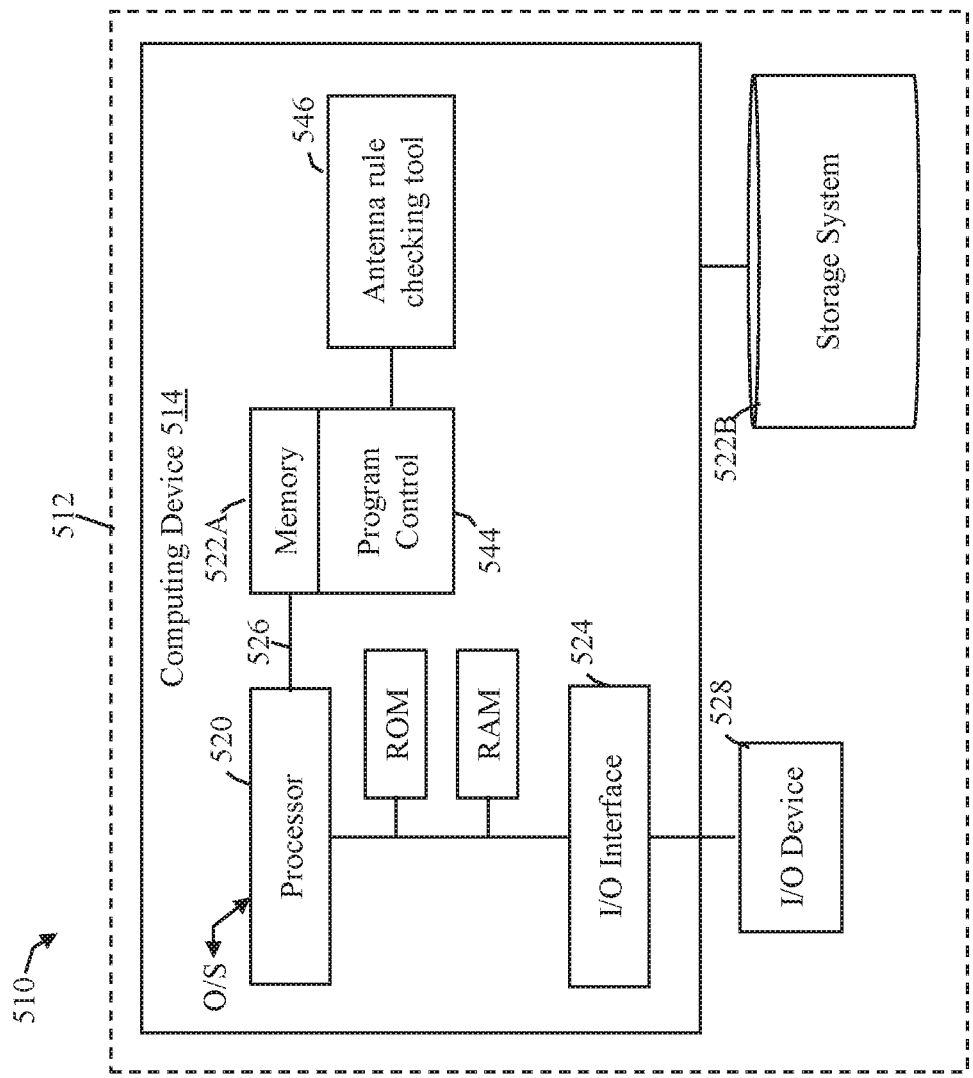
FIG. 5 is an illustrative environment for implementing the steps in accordance with aspects of the invention.

FIG. 5 shows an illustrative environment 510 for managing the processes in accordance with the invention. To this extent, the environment 510 includes a server 512 or other computing system that can perform the processes described herein. In particular, the server 512 includes a computing device 514. The computing device 514 can be resident on a network infrastructure or computing device of a third party service provider (any of which is generally represented in FIG. 1).

The computing device 514 also includes a processor 520 (e.g., CPU), memory 522A, an I/O interface 524, and a bus 526. The memory 522A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 514 is in communication with external I/O device/resource 528 and storage system 522B. For example, I/O device 528 can comprise any device that enables an individual to interact with computing device 514 (e.g., user interface) or any device that enables computing device 514 to communicate with one or more other computing devices using any type of communications link. The external I/O device/resource 528 may be for example, a handheld device, PDA, handset, keyboard etc.

In general, processor 520 executes computer program code (e.g., program control 544), which can be stored in memory 522A and/or storage system 522B. Moreover, in accordance with aspects of the invention, program control 544 controls an antenna rule checking tool 546 that performs one or more of the processes described herein (e.g., as described in FIG. 4). The antenna rule checking tool 546 can be implemented as one or more program code in program control 544 stored in memory 522A as separate or combined modules. Additionally, the antenna rule checking tool 546 may be implemented as separate dedicated processors or a single or several processors to provide the function of these tools. While executing the computer program code, the processor 520 can read and/or write data to/from memory 522A, storage system 522B, and/or I/O interface 524. The program code executes the processes of the invention. The bus 526 provides a communications link between each of the components in computing device 514.

The computing device 514 can comprise any general purpose computing article of manufacture capable of executing computer program code installed thereon (e.g., a personal computer, server, etc.). However, it is understood that computing device 514 is only representative of various possible equivalent-computing devices that may perform the processes described herein. To this extent, in embodiments, the functionality provided by computing device 514 can be implemented by a computing article of manufacture that includes any combination of general and/or specific purpose hardware and/or computer program code. In each embodiment, the program code and hardware can be created using standard programming and engineering techniques, respectively.

Similarly, server 512 is only illustrative of various types of computer infrastructures for implementing the invention. For example, in embodiments, server 512 comprises two or more computing devices (e.g., a server cluster) that communicate over any type of communications link, such as a network, a shared memory, or the like, to perform the process described herein. Further, while performing the processes described herein, one or more computing devices on server 512 can communicate with one or more other computing devices external to server 512 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A semiconductor structure, comprising:
   a transistor comprising a gate and a source/drain;
   at least one first electrically conductive element;
   at least one second electrically conductive element;
   a first electrically conductive path from the gate to the at least one first electrically conductive element;
   a second electrically conductive path from the source/drain to the at least one second electrically conductive element; and
   a third electrically conductive path from the gate to the source/drain;
   wherein the transistor satisfies the expression:

$Rsd/(Rsd+Rg+Rs)*1/(Rg+Rs) < X$ where: Rg is the resistance of the first electrically conductive path;
   Rsd is the resistance of the second electrically conductive path;
   Rs is the resistance of the third electrically conductive path;
   X is a limit value that is greater than 0.797 and less than 0.851; and
   wherein the first electrically conductive path comprises plural circuit elements connected between the gate to the at least one first electrically conductive element, and Rg is a series resistance of the plural circuit elements.

2. The semiconductor structure of claim 1, wherein the at least one first electrically conductive element and the at least one second electrically conductive element each comprise one of a wire, via, and interconnect that is exposed to plasma during a manufacturing step of the semiconductor structure.

3. The semiconductor structure of claim 1, wherein:
   the second electrically conductive path comprises plural circuit elements connected between the source/drain to the at least one second electrically conductive element; and
   Rsd is a series resistance of the plural circuit elements.

4. The semiconductor structure of claim 1, wherein:
   the third electrically conductive path comprises plural circuit elements connected between the gate to the source/drain; and
   Rs is a series resistance of the plural circuit elements.

5. The semiconductor structure of claim 1, wherein the at least one first electrically conductive element comprises plural first electrically conductive elements that are exposed to plasma during a manufacturing step of the semiconductor structure.

6. The semiconductor structure of claim 5, wherein the first electrically conductive path comprises plural respective paths from the plural first electrically conductive elements to the gate.

7. A semiconductor structure, comprising:
   a transistor comprising a gate and a source/drain;
   at least one first electrically conductive element;
   at least one second electrically conductive element;
   a first electrically conductive path from the gate to the at least one first electrically conductive element;
   a second electrically conductive path from the source/drain to the at least one second electrically conductive element; and
   a third electrically conductive path from the gate to the source/drain;
   wherein the transistor satisfies the expression:

$Rsd/(Rsd+Rg+Rs)*1/(Rg+Rs) < X$ where: Rg is the resistance of the first electrically conductive path;
   Rsd is the resistance of the second electrically conductive path;
   Rs is the resistance of the third electrically conductive path; and
   X is about 0.82;
   wherein Rg is a series resistance of plural circuit elements connected between the gate to the at least one first electrically conductive element;
   Rsd is a series resistance of plural circuit elements connected between the source/drain to the at least one second electrically conductive element; and
   Rs is a series resistance of plural circuit elements connected between the gate to the source/drain.

* * * * *